United States Patent
Freakes et al.

(10) Patent No.: US 9,835,431 B1
(45) Date of Patent: Dec. 5, 2017

(54) APPARATUS AND METHODS FOR GAUGING PARTS

(71) Applicant: Connecting Products Inc., Lawrenceville, NJ (US)

(72) Inventors: Anthony Freakes, Lawrenceville, NJ (US); Lin Huang, Skillman, NJ (US); Adam Li, Skillman, NJ (US); Franklin W Agramonte Andujar, El Paso, TX (US); Ivan P Nieves Hernandez, El Paso, TX (US); Marcelino Montoya Ruiz, El Paso, TX (US); Carlos C Reyes, El Paso, TX (US)

(73) Assignee: Connecting Products Inc., Lawrenceville, NJ (US)

( * ) Notice: Subject to any disclaimer, the term of this patent is extended or adjusted under 35 U.S.C. 154(b) by 115 days.

(21) Appl. No.: 15/041,331

(22) Filed: Feb. 11, 2016

Related U.S. Application Data

(60) Provisional application No. 62/115,263, filed on Feb. 12, 2015.

(51) Int. Cl.
*G01B 3/34* (2006.01)
*G01B 5/02* (2006.01)
*G01B 5/08* (2006.01)

(52) U.S. Cl.
CPC .............. *G01B 3/34* (2013.01); *G01B 5/02* (2013.01); *G01B 5/08* (2013.01)

(58) Field of Classification Search
CPC ..................................... G01B 5/02; G01B 5/08
USPC ........................................... 33/1 BB, 563, 572
See application file for complete search history.

(56) References Cited

U.S. PATENT DOCUMENTS

| | | | | |
|---|---|---|---|---|
| 5,501,020 A | * | 3/1996 | Welt | B25H 3/003 33/555.2 |
| 6,219,930 B1 | * | 4/2001 | Reid | G01B 3/14 33/1 BB |
| 6,422,134 B1 | * | 7/2002 | Barksdale | A47J 37/0704 126/25 R |
| 6,594,914 B1 | * | 7/2003 | Babcock | A63C 3/10 33/535 |
| 7,086,172 B2 | * | 8/2006 | Åstrom | A61M 5/427 33/563 |
| 7,603,787 B1 | * | 10/2009 | Butler, III | B07C 1/10 33/501.45 |
| 2002/0100180 A1 | * | 8/2002 | Montefusco | B43L 13/205 33/563 |
| 2014/0161574 A1 | * | 6/2014 | Pope | A01D 51/002 414/440 |

\* cited by examiner

*Primary Examiner* — G. Bradley Bennett
(74) *Attorney, Agent, or Firm* — Timothy X. Gibson, Esq.; Gibson & Dernier LLP

(57) ABSTRACT

Inspection apparatus and methods for inspecting parts include a drum including a chamber for receiving parts to be inspected and at least one screen having at least one gauge formed therein, wherein the drum is configured to be rotatably mountable on a support, and wherein rotation of the drum is operable to present parts to be inspected to the at least one gauge.

20 Claims, 13 Drawing Sheets

APPARATUS AND METHODS FOR GAUGING PARTS

CROSS-REFERENCE TO RELATED APPLICATIONS

This application claims the benefit of U.S. Provisional Patent Application No. 62/115,263 filed Feb. 12, 2015, the entirety of which incorporated herein by reference.

FIELD OF THE INVENTION

The invention relates to devices and methods for gauging parts and more specifically, to devices and methods for inspecting diameters of pins, balls and other parts.

BACKGROUND

Mechanical and electrical consumer products are assemblies of parts. The quality and cost of the finished products depends heavily on the quality and cost of the individual components. It only takes one part not fitting properly to severely disrupt assembly, leading to unplanned increases in the time required to complete a product, with attendant increases in cost.

The biggest defense against this disruption is to make sure that all parts are perfectly correct before they are brought to the assembly floor. To do this perfectly requires 100% inspection, that is, a rigorous examination of at least the vital dimensions, which influence smooth, easy assembly.

SUMMARY OF THE INVENTION

Inspection of each and every part in an apparatus is time consuming, and also adds cost. Apparatus and methods are disclosed for inspecting parts in cost effective, time saving manner.

An inspection apparatus is disclosed including a drum having a chamber for receiving parts to be inspected and at least one screen having at least one gauge formed therein, wherein the drum is configured to be rotatably mountable on a support, and wherein rotation of the drum is operable to present parts to be inspected to the at least one gauge. The gauge(s) is/are dimensioned to allow or deny parts rotating within the drum to exit the drum. The screen may include a plurality of gauges.

The drum may include a fill opening for receiving parts into the chamber. The drum may be substantially cylindrical and include an outer surface circumscribing the chamber, and the at least one screen is formed in the outer surface.

In some embodiment the opening may be formed in a side thereof and the at least one screen serves as a cover for the opening. In other embodiments the drum is of a clamshell configuration and can be opened to fill a chamber of the drum with parts to be inspected. The screen may be removable for easy replacement of worn or damaged screens, to change the screen to provide different sized gauges depending on the gauge, diameter or dimension to be gauged of the part to be inspected, or to provide an opening to receive parts to be inspected.

In some embodiments the rotatable drum may be equipped to vibrate to enhance agitation and assist flow of parts through the aperture.

In another embodiment a vibrating tray having one or more aperture screens is provided, whereby vibration of the tray causes agitation sufficient to present the parts to be inspected to the test aperture and permit or deny exit of the parts being inspected.

In another embodiment the apparatus includes at least two adjacent screens formed in the outer surface of the drum. In another embodiment, a tumbler device may include a rotatable drum fitted with at least two screens, one of which gauges the maximum diameter and another which gauges the minimum diameter, whereby the device includes a plate or block operable to block the screen not to be used. The apparatus may include a cover configured and dimensioned to cover at least one of the two screens formed in the outer surface of the drum.

In still a further embodiment, an inspection apparatus includes at least two concentric drums spaced a preselected distance apart, wherein an inner of the at least two concentric drums includes a screen comprising a plurality of gauges formed therein dimensioned to test a maximum width of a part under inspection, and an outer of the at least two concentric drums includes a screen having a plurality of gauges formed therein dimensioned to test a minimum width of a part under inspection wherein the screens are arranged radially on a drum support surface. The concentric drums may be open on one side. The apparatus may include a cover dimensioned and configured to fit over and cover the concentric drums on the open side.

The concentric drums may include a plurality of adjacent screens, each screen having at least one gauge. In some embodiments the apparatus includes more than two concentric drums wherein an innermost of the more than two concentric drums includes a screen having a plurality of gauges formed therein dimensioned to test a maximum width of a part under inspection, and an outermost of the more than two concentric drums includes a screen having a plurality of gauges formed therein dimensioned to test a minimum width of a part under inspection, and at least one concentric drum positioned between the innermost and outermost drums includes a plurality of gauges formed therein dimensioned to test a width less than the maximum but more than the minimum width of a part under inspection. In some embodiments the gauges of screens of concentrically arranged drums are sized in descending order from the innermost drum to the outermost drum.

In still further embodiments a ring module is provided including a plurality of gauges formed on an outer surface thereof, and a plurality of grooves, each of the grooves dimensioned to receive a screen having gauges, and a plurality of screens positioned in the grooves such that gauges of the plurality of screens are in register with the gauges of the ring module. A drum support surface may include a fill opening formed therein in axial alignment with an annular space formed by an interior diameter of the inner drum.

The apparatus may further include comprising a support upon which the drum is rotatably mountable. The drum may include an axle extending from an end thereof and rotatably mountable to the support. The apparatus may further include a drive apparatus such but not limited to a motor operably linked to a belt drive or the like operable to rotate the drum.

At least one advantage of the inspection devices disclosed herein is that the devices can be employed in a method to simply examine manufacturing capability and productive capability and thus eliminate the expensive process of sampling, measuring and calculation required by Production Part Approval Process (PPAP) procedures.

In accordance with one embodiment, a method of inspecting a diameter of a part includes providing a device as disclosed herein, providing at least two screens having gauges sized to select parts within a preselected tolerance range, loading a plurality of parts to be inspected into the drum, rotating the drum, removing any part that does not pass through at least one of the screens, and conducting a subsequent examination using a gauge set at a second preselected tolerance range. After inspection, parts may be evaluated by weight to determine parts per kilogram (Ppk).

Methods and apparatus disclosed herein have been found to reduce the time it takes to perform a 100% inspection of mechanical parts in some instances from 6 hours to 20 minutes. Thus, applying the disclosed methods and apparatus reduced inspection time to 5.6% of the time it previously took to inspect the same parts. Moreover, once the materials to be inspected are introduced into the disclosed apparatus, the inspection process is automatic. This enables a person supervising the inspection operation, during the 20 minutes of operation, to perform other tasks such as collecting and supplying different materials to another similar inspection system. If this collection and supply and the disposal of the results takes 2 minutes, then that inspection now takes 5.6% of the previous inspection time, representing a considerable advance in productivity.

BRIEF DESCRIPTION OF THE DRAWINGS

For the purposes of illustration, there are forms shown in the drawings that are presently preferred, it being understood, however, that the invention is not limited to the precise arrangements and instrumentalities shown.

DETAILED DESCRIPTION OF THE INVENTION

Figure 1:
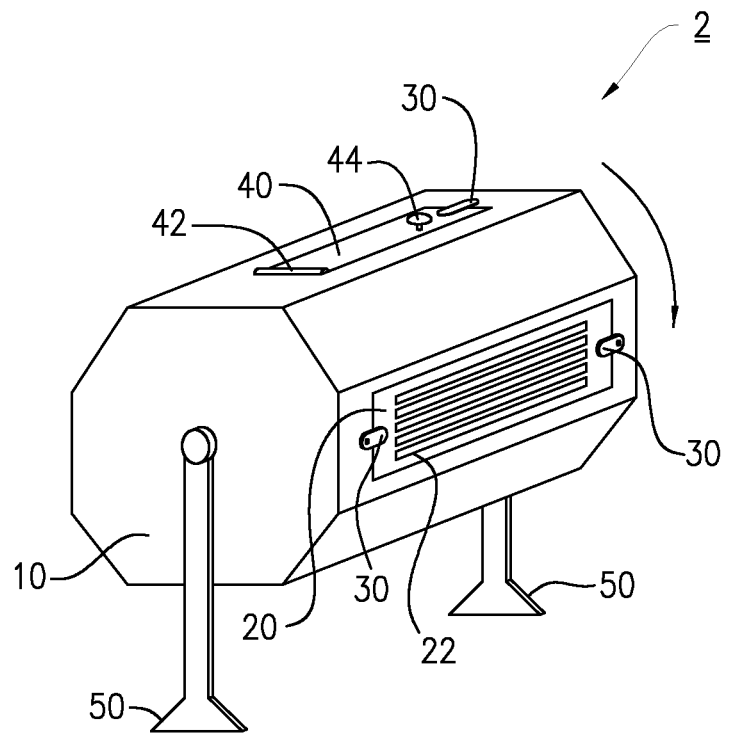
FIG. 1 is a perspective view of a view of an inspection device in accordance with one or more embodiments of the present invention.

The present invention now will be described more fully hereinafter with reference to the accompanying drawings, in which illustrative embodiments of the invention are shown. In the drawings, the relative sizes of regions or features may be exaggerated for clarity. This invention may, however, be embodied in many different forms and should not be construed as limited to the embodiments set forth herein; rather, these embodiments are provided so that this disclosure will be thorough and complete, and will fully convey the scope of the invention to those skilled in the art.

It will be understood that when an element is referred to as being "coupled" or "connected" to another element, it can be directly coupled or connected to the other element or intervening elements may also be present. In contrast, when an element is referred to as being "directly coupled" or "directly connected" to another element, there are no intervening elements present. Like numbers refer to like elements throughout. As used herein the term "and/or" includes any and all combinations of one or more of the associated listed items.

In addition, spatially relative terms, such as "under", "below", "lower", "over", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is inverted, elements described as "under" or "beneath" other elements or features would then be oriented "over" the other elements or features. Thus, the exemplary term "under" can encompass both an orientation of over and under. The device may be otherwise oriented (rotated 90 degrees or at other orientations) and the spatially relative descriptors used herein interpreted accordingly.

Well-known functions or constructions may not be described in detail for brevity and/or clarity.

The terminology used herein is for the purpose of describing particular embodiments only and is not intended to be limiting of the invention. As used herein, the singular forms "a", "an" and "the" are intended to include the plural forms as well, unless the context clearly indicates otherwise. Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Figure 1A:
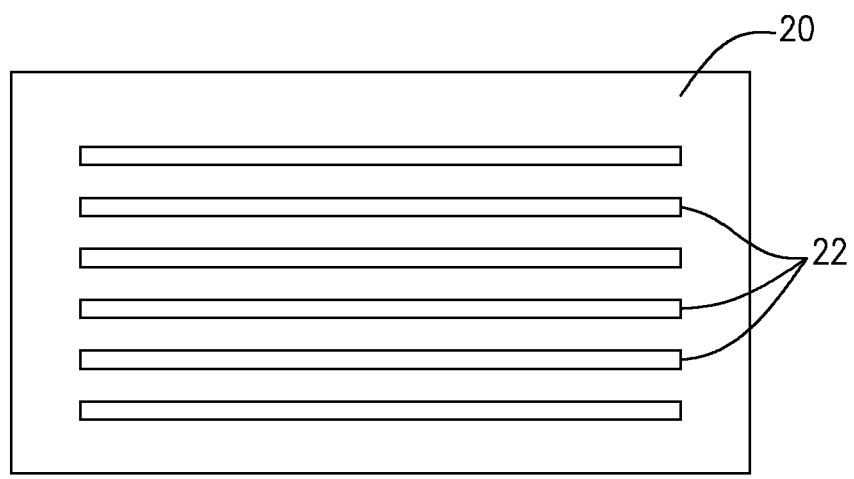
FIG. 1A is a front view of a screen with gauges for an inspection device in accordance with one or more embodiments of the present invention.
Figure 2:
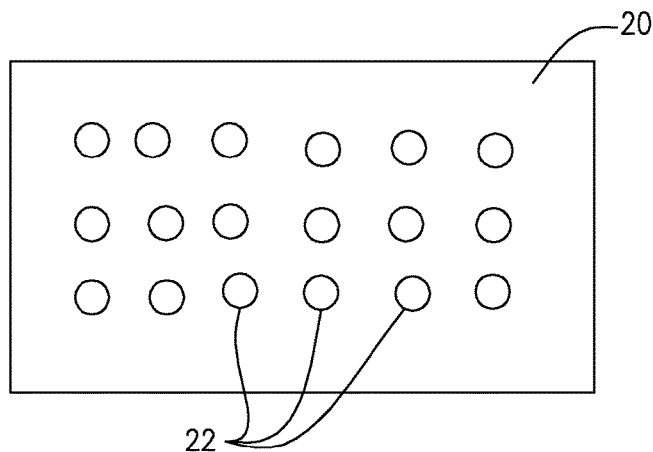
FIG. 2 is a front view of a screen with gauges for an inspection device in accordance with one or more embodiments of the present invention.

With reference to FIGS. 1 and 1A, in one embodiment a sorting device 2 includes a rotatable drum 10 including one or more screens 20, each of the screens 20 having one or more gauges 22 dimensioned to permit or deny parts within the rotatable drum 10 to exit from the interior of the drum 10. The gauges 22 may be openings, apertures, slots or any shaped opening dimensioned to ban or pass a particular device under inspection. The screens 20 may be removably mountable to the drum 10 so that screens 20 having different sized and/or shaped gauges 22 may be employed, depending on the gauge of the device to be inspected. For example, and not by way of limitation, a screen 20 may be removably retained by clips 30. Various screen may employed with the sorting device. For example, with further reference to FIG. 2, a screen 20 with round shaped gauges 22 is shown. One skilled in the art will recognize screen of different shapes and sizes may be employed in connection with the embodiments disclosed herein.

In another embodiment, the screen(s) 20 may include one or more adjustable gauges 22. For example, a screen 20 including a plurality of gauges 22 may further include a second screen with gauges 22 adjacent thereto, wherein the respective gauges 22 of the adjacent screens 20 may be positioned in register to provide a maximum gauge size. Relative movement of the screens causes the respective gauges to overlap, narrowing the effective gauge of the screens 20.

Parts to be inspected, such as but not limited to pins, balls or the like, are loaded into the drum through an access opening. In one embodiment the access opening includes a cover 40 or the like to retain the parts to be inspected after being loaded into the drum 10. Cover 40 may be hinged as shown (hinge 42) and include a knob 44 to facilitate opening. One or more clips 30 such as swivel clips may be employed to keep the cover 40 closed. It will be apparent to the skilled artisan many types of covers, doors, hatches, etc. and devices to keep them closed may be used to close the access opening. In some embodiments the access opening may be an opening configured to receive a screen 20. Removal of the screen 20 allows the drum 10 to be filled with parts to be inspected. Once filled, the screen 20 can be replaced over the opening.

Once the drum 10 is loaded, rotation of the drum 10 can commence. The drum can be rotatably mounted on supports 50 and rotated manually or automatically by a motor or the like operably coupled thereto. A vibration producing device (not shown) can be used to cause the drum 10 to vibrate, enhancing agitation of the parts to assist flow thereof to the gauge(s) 22. Rotation of the drum causes all of the parts to eventually encounter at least one of the gauges 22. Some or all of the parts tested pass through the gauge(s) 22. The apparatus and methods described move and agitate the parts to be tested for as long a time as it takes to ensure that each part under inspection is presented to the gauge(s) in the screen. As parts are tumbled by rotation of the drum, gravity keeps the parts under inspection toward the bottom of the tumbling apparatus. Any parts that do not pass through the gauge(s) 22 remain in the drum. Depending on the limit being inspected, parts remaining in the drum 10 may be considered to have failed or passed inspection.

The apparatus and methods described are ideally suited to small cylindrical pins and balls. However, it will be apparent to those skilled in the art that other sized and shaped parts, such as but not limited to those with square, rectangular, triangular, hexagonal, etc. cross-sections, can be inspected as well. It will also be apparent to the skilled artisan that the greater the number of gauges 22 in the screen 20, the greater the productivity.

In a first example and experiment, and not by way of limitation, a steel pin having a given diameter specification required inspection. The exemplary pin diameter specification was 0.078"+0.000/−0.005". The diameter of the pin in this example is vital, because if it is oversized, it will not fit into a mating orifice at assembly. Ordinarily, the diameter of each of the pins would need to be gauged by measuring micrometer. However, placing a plurality of pins in a drum having at least one screen with a plurality of slot-shaped gauges having a width of the maximum allowable diameter and rotating the drum proved to be a surprisingly effective and exceedingly fast way to eliminate out-of-specification pins. The screen acted as a sieve, so that as the drum rotated and tumbled the pins contained therein, the pins inside which were under the maximum dimension gradually exited through the gauges. After 20 minutes the exiting pin flow stopped and when the drum was opened, the few pins left inside were all oversized, out-of-specification rejects.

Similarly, for checking minimum diameter, the screen may be replaced with a screen having one or more gauges wherein the gauge width is at the minimum specified size for a device of interest. When the drum rotates, only out-of-specification parts pass through the gauges. After the flow of exiting parts ceases, those remaining in the drum may be considered acceptable, i.e., all above the minimum acceptable size.

Figure 3:
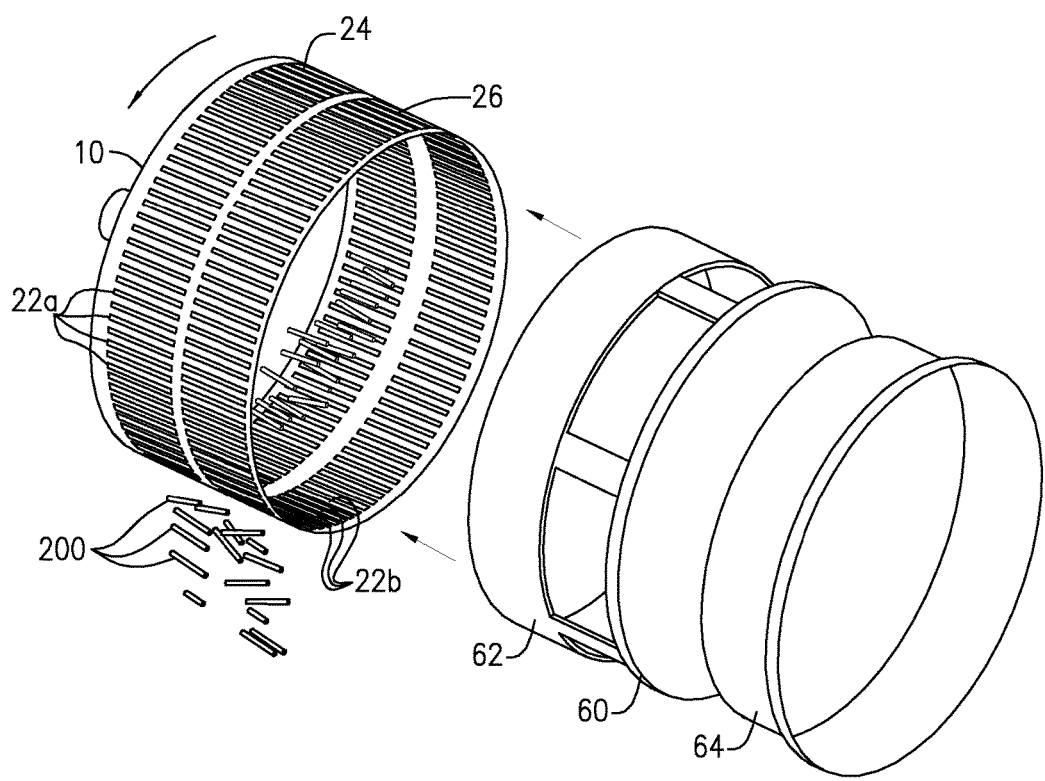
FIG. 3 is a perspective view of a view of an inspection device and a double-ended cover in accordance with one or more embodiments of the present invention.

Now referring to FIG. 3, in another embodiment, a tumbler device 2 may include a rotatable drum 10 fitted with at least two screens 20, one of which gauges the maximum diameter and another which gauges the minimum diameter, whereby the device includes a plate or block operable to block the screen not to be used. For example, in one embodiment a tumbler includes a drum 10 having a plurality of gauges 22 arranged in adjacent circular rows 24, 26, one row having the maximum gauge and the other row having the minimum gauge. The drum 10 may be rotatably mounted, such as on a spindle, support or the like as described herein. One or more covers may be employed to block one of the circular rows 24, 26 so that inspection for the parameter dictated by the exposed row can be performed. For example, a cover 60 dimensioned to fit annularly over the drum has a first end 62 configured to expose the row 26 having maximum width slots (gauges 22b), and an opposite end 64 configured to expose the row 24 having the minimum width slots (gauges 22a). It will be apparent to the skilled artisan that other covers may be employed, such as an elastic band, a hoop or the like to cover the circular row not in use. This arrangement increases productivity, by virtue of having more gauges 22 to which the parts 200 being inspected are presented. Any suitable number of gauges may be employed, depending on the type, number and size of the parts to be tested. This embodiment, which may accommodate a large number of gauges, is well suited to long term, large batches.

Figure 4:
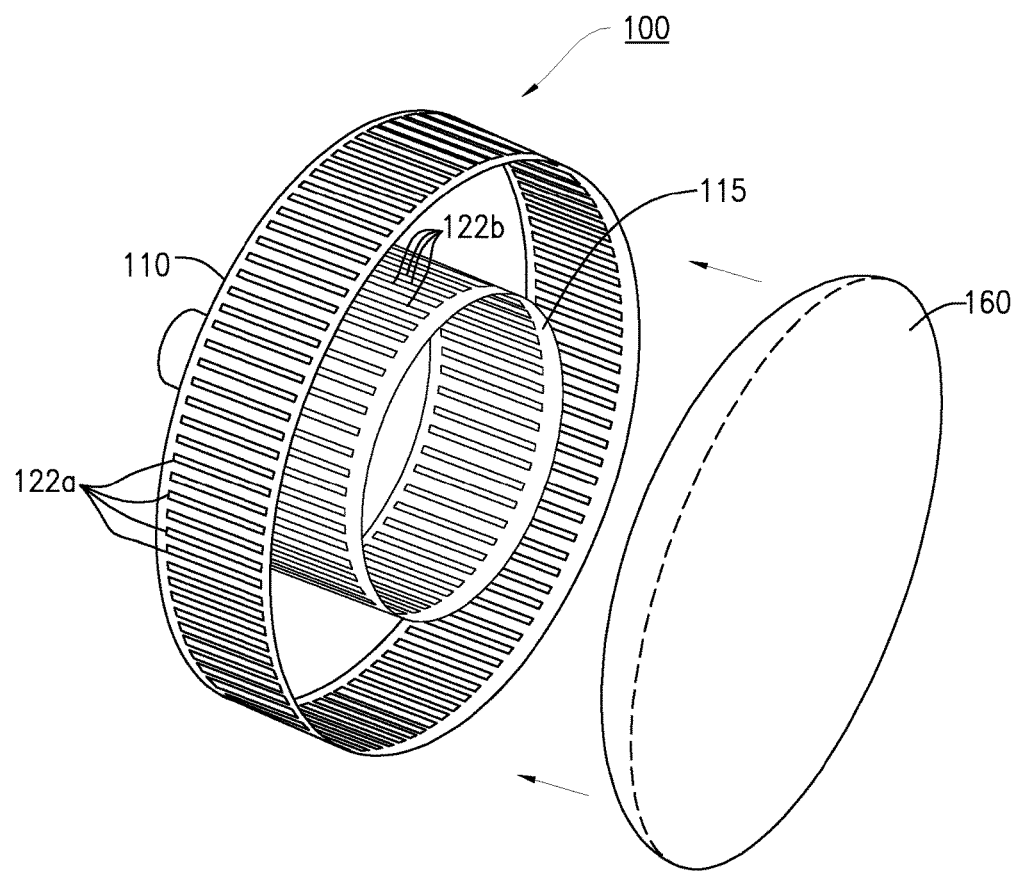
FIG. 4 is a perspective view of for an inspection device and cover in accordance with one or more embodiments of the present invention.

Now referring to FIG. 4, in a further embodiment, a device 100 includes an outer drum 110 and inner drum 115 arranged concentrically. The device 100 is rotatably mountable on a support. Outer drum 110 has a bank of gauges 122a having the minimum width. Inner drum 115 has a bank of gauges 122b which have the maximum width.

The parts to be inspected are placed within the inner drum 115. A cover 160 may be included and be deployed to retain the parts in place during tumbling. After a time interval of tumbling, acceptable parts exit through the gauges 122b and fill the space between the outer and inner drums 110, 115, respectively. Then those parts, which are below the minimum size, exit through the outer drum gauges 122*a*. This operation leaves acceptable product within the annular space between the two drums 110 and 115.

The parts still within the inner drum 115 are too large and can be removed and reworked, if desired, or discarded, while the parts which exit from the outer drum 110 are too small and may be disposed of or reworked into a different product. This embodiment, which may accommodate a large number of gauges, is well suited to long term, large batches.

Figure 5:
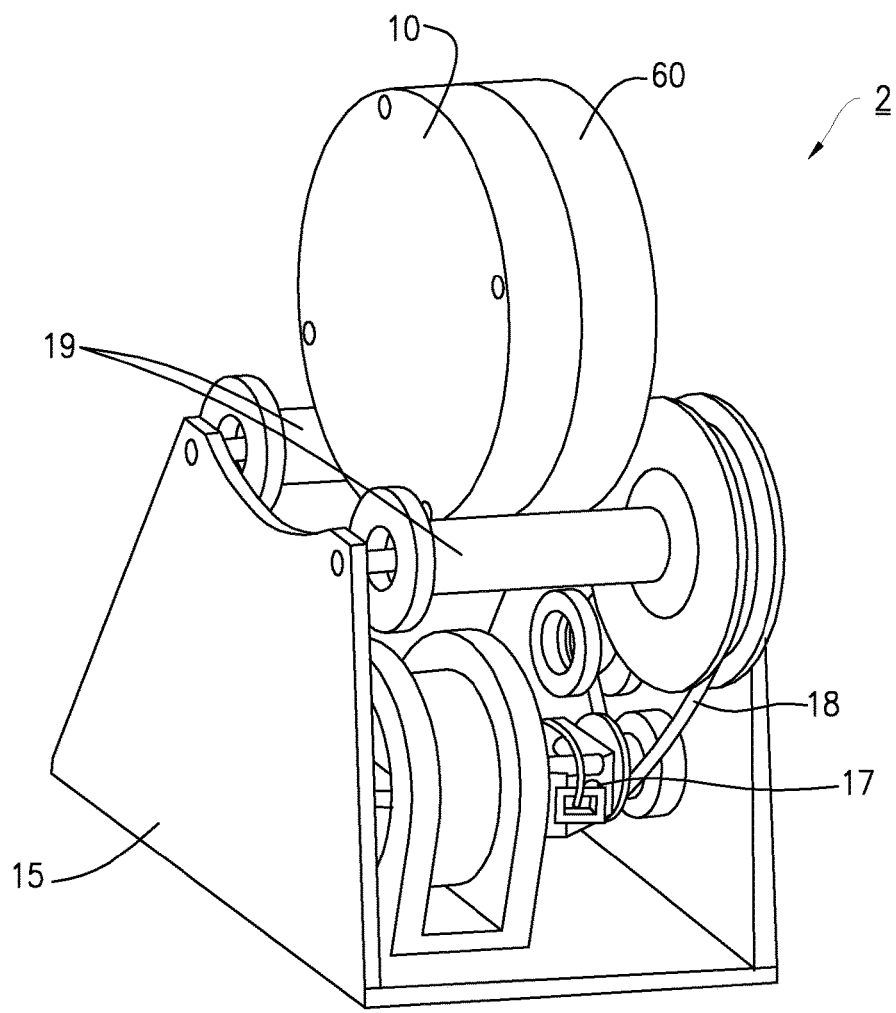
FIG. 5 is a perspective view of an inspection device with a drive apparatus in accordance with one or more embodiments of the present invention.

Now referring to FIG. 5, a further embodiment of an inspection apparatus 2 includes rollers 19 rotatably mounted on a base 15. The rollers are driven by a motor 17 operably linked to the rollers 19, such as but not limited to by belt 18 or the like. A drum 10 containing gauges, examples of which are described below, and optionally including a cover 60, may be placed on the rollers 19. In this embodiment the drum 10 need not be mounted to a spindle—it can simply be placed on the rollers. The rollers may include flanges to inhibit lateral movement of the drum 10. The motor 17 drives the rollers, thereby rotating the drum 10.

Figure 6:
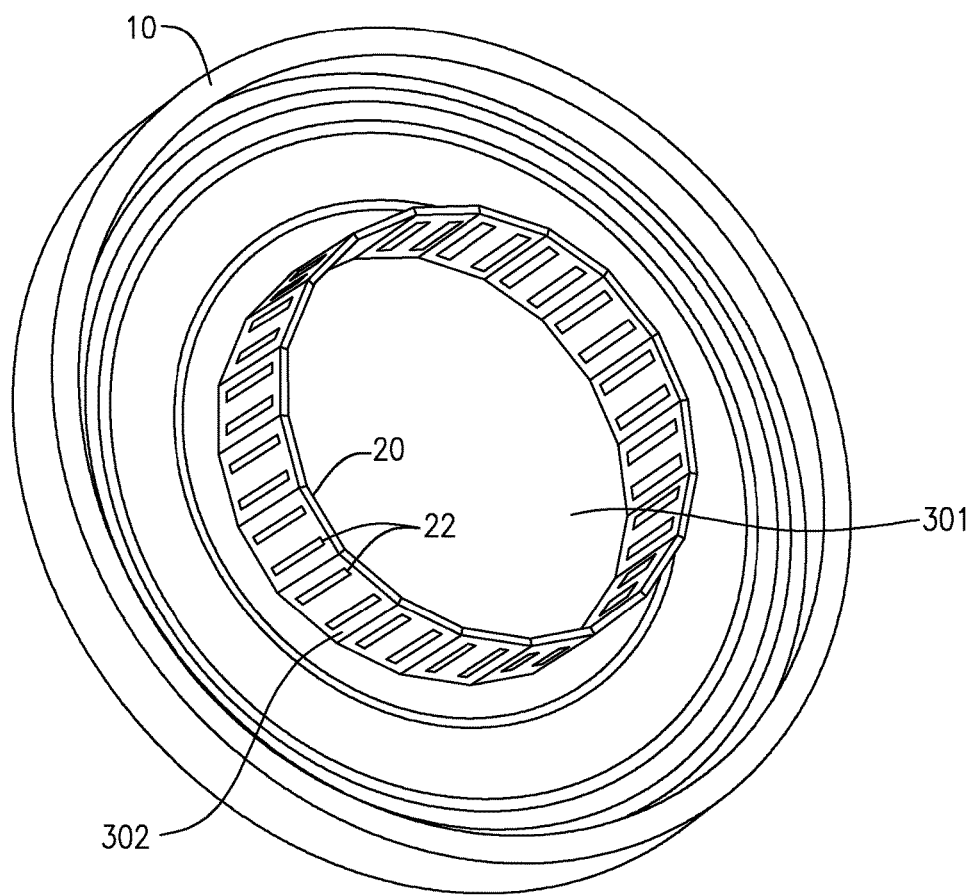
FIG. 6 is a perspective view of a drum apparatus in accordance with one or more embodiments of the present invention.
Figure 6A:
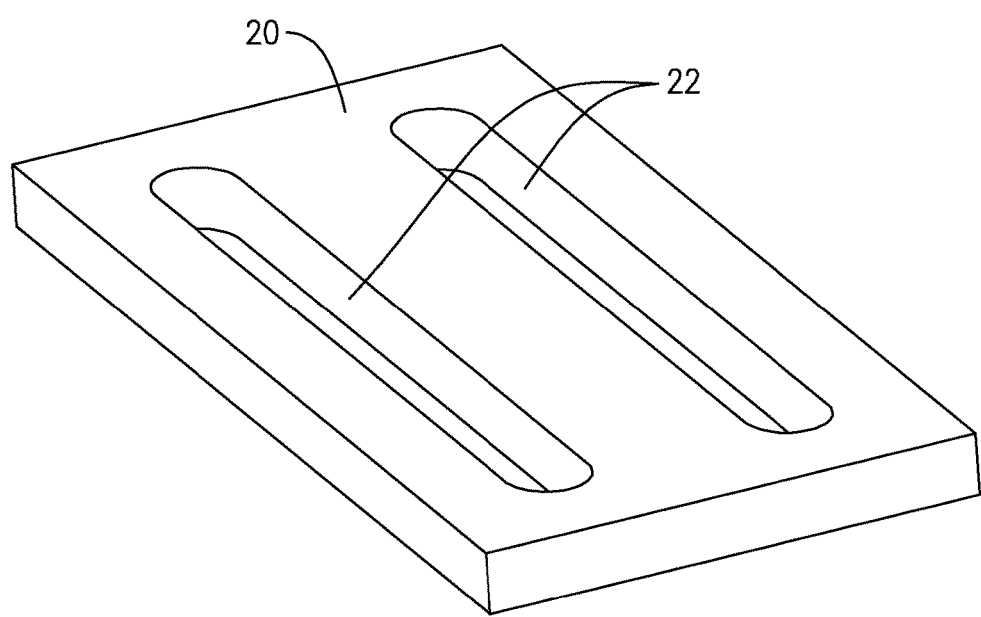
FIG. 6A is a perspective view of a screen of FIG. 6 in accordance with one or more embodiments of the present invention.
Figure 7:
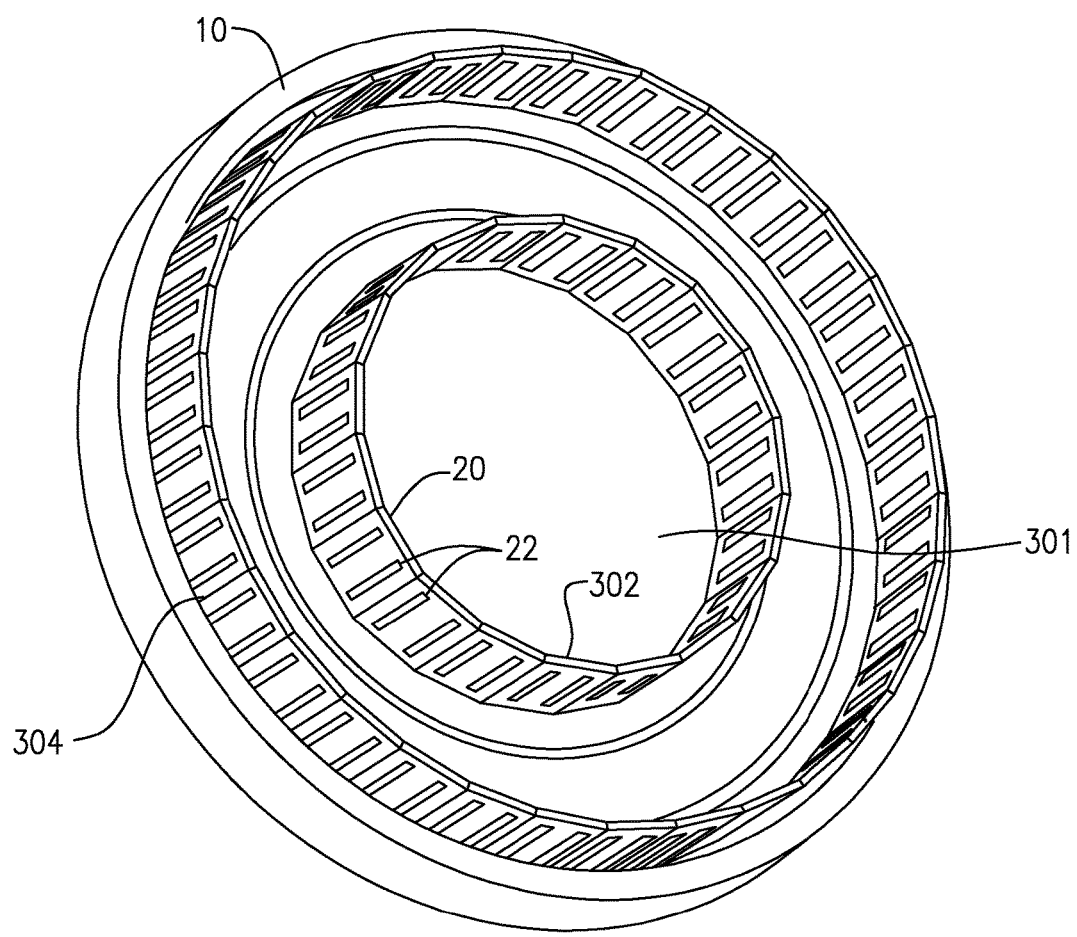
FIG. 7 is a perspective view of a drum apparatus in accordance with one or more embodiments of the present invention.
Figure 8:
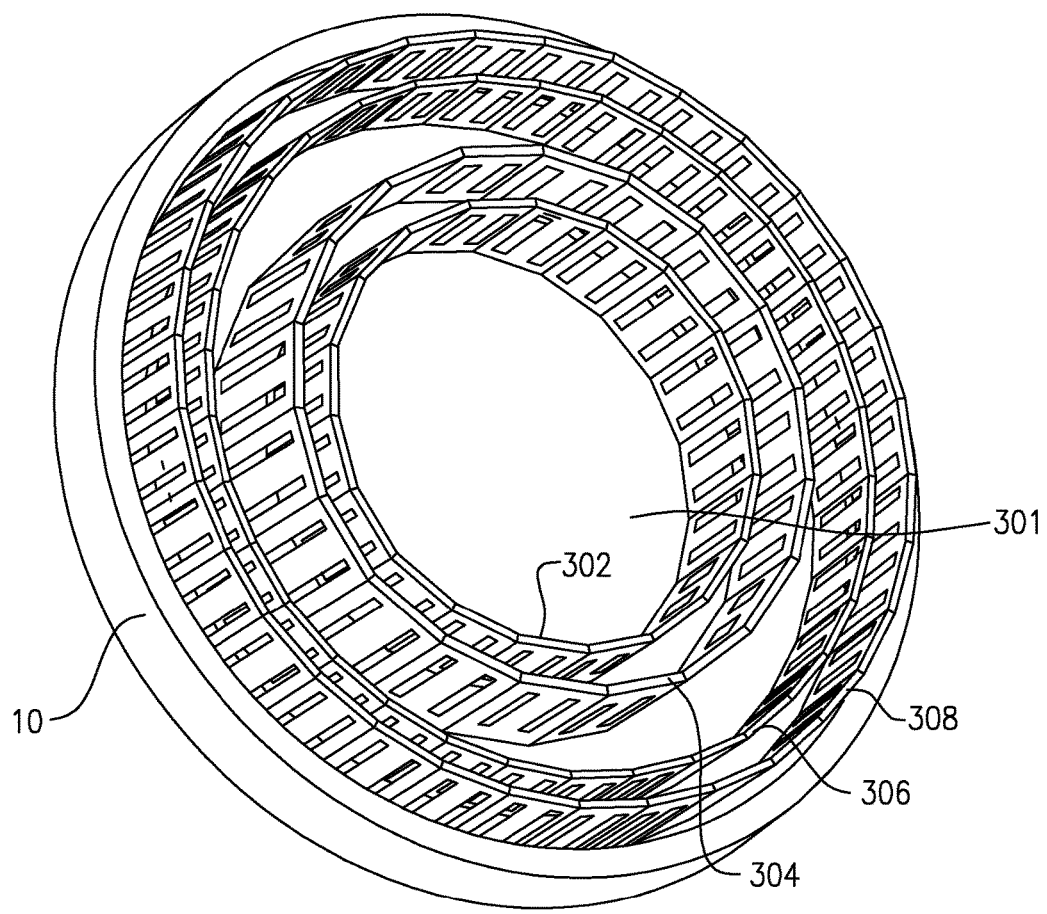
FIG. 8 is a perspective view of a drum apparatus in accordance with one or more embodiments of the present invention.

Now referring to FIGS. 6 and 6A, in another embodiment a drum 10 includes a plurality of screens 20 having gauges 22 (as shown in FIG. 6A) arranged to form a ring 302 mounted to an interior face of the drum 10. With reference to FIG. 7, in. another embodiment, drum 10 includes a concentric outer ring 304 composed of gauges 20. With reference to FIG. 8, another embodiment includes concentric rings 302, 304, 306 and 308, each composed of a plurality of screens 20 with gauges 22. The gauges may 22 be progressively smaller in size from the innermost ring to the outermost ring. Parts to be inspected in all of the embodiments of FIGS. 6-8 may be loaded into the central region 301. Cover 60 is dimensioned and configured to be secured to the drum 10 to cover the ring or rings 302, 304, 306, 308 such as by a snap-fit, screw-on or other means well known to those having ordinary skill in the art. Once loaded with parts, the drum may be rotated on a tumbler apparatus such as that shown in FIG. 5, subjecting the parts to inspection. The parts are subjected to the gauges 22 and some may pass through some or all of the gauges 22, and some may not pass through any gauges 22 as described above. After a given time period, the drum 10 can be removed from the tumbler apparatus, the cover 60 removed, and the parts removed and sorted as desired.

Figure 9:
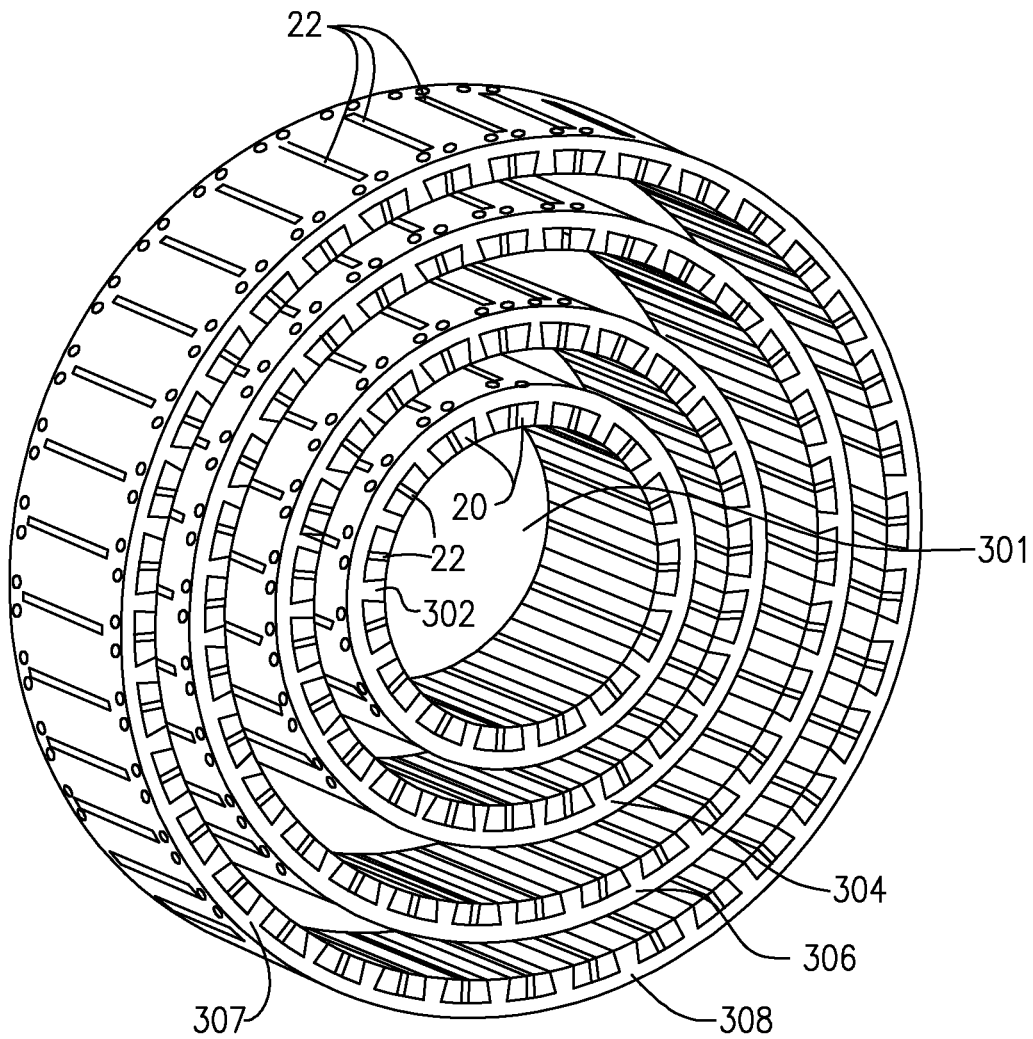
FIG. 9 is a perspective view of a drum arrangement with a ring module in accordance with one or more embodiments of the present invention.
Figure 9A:
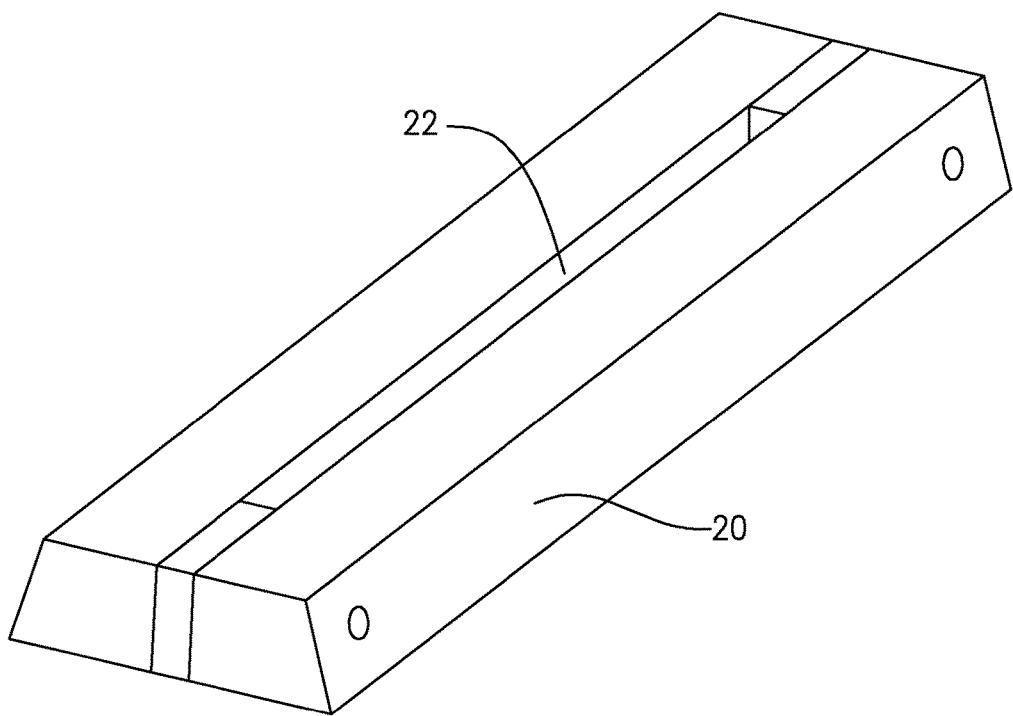
FIG. 9A is a perspective view of a screen of FIG. 9 in accordance with one or more embodiments of the present invention.

Now referring to FIG. 9, another embodiment of concentric rings that may be employed in a drum 10 is shown. Each of the rings 302, 304, 306, 308 include a ring module 307 having gauges 22, and screens 20 with gauges 22 are fitted in the ring module 307 such that the gauges 22 of the individual screens are in register with the gauges 22 of the ring module 307. This embodiment permits replacement of screens 20 which may become worn over time, or with screens having different-sized gauges to inspect different sized parts. Exemplary screens 20 are shown in FIG. 9A. The screens 20 may be slidably inserted or snap-fit into ring module 307. It will be apparent to those skilled in the art that various designs of screens 20 and ring modules 307 may be employed.

Figure 10:
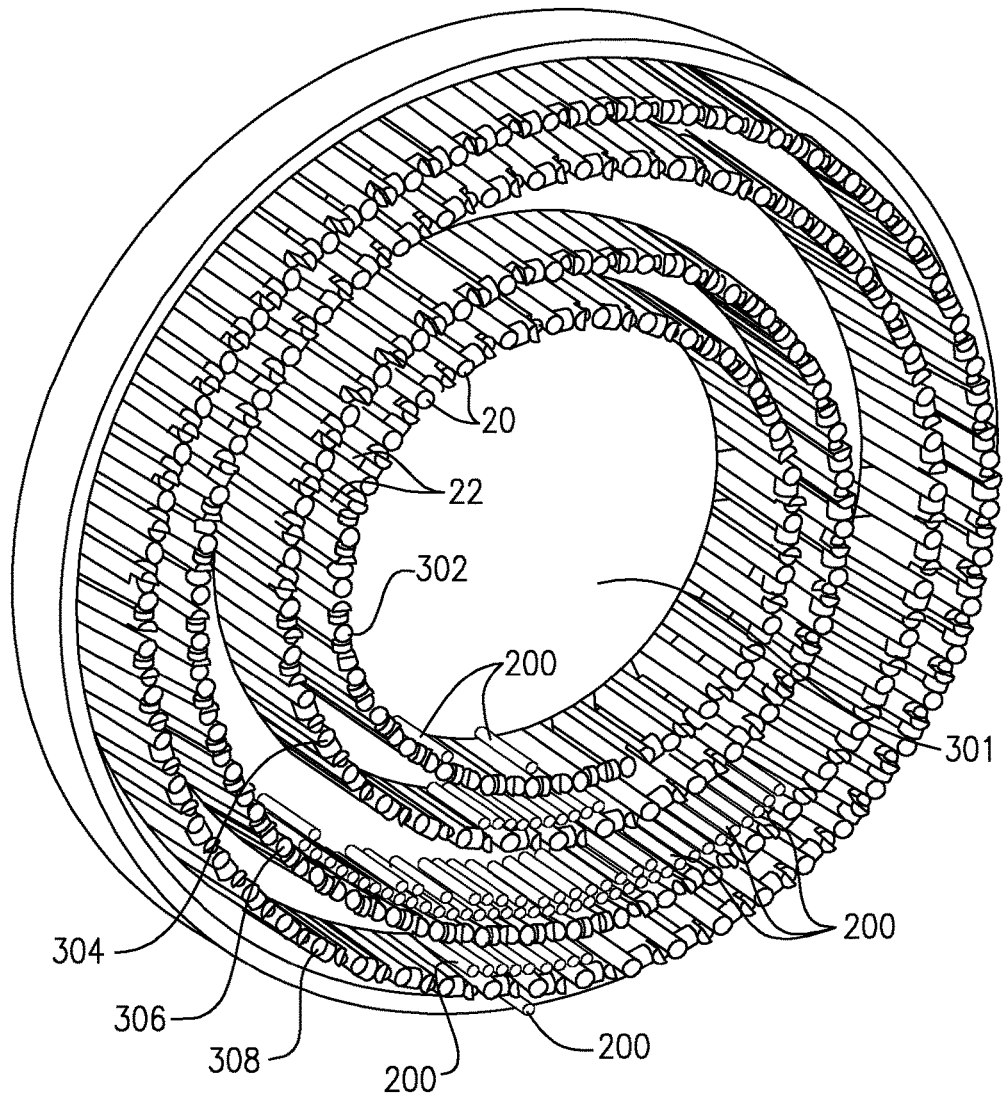
FIG. 10 is a perspective view of a drum apparatus showing parts under inspection in accordance with one or more embodiments of the present invention.
Figure 10A:
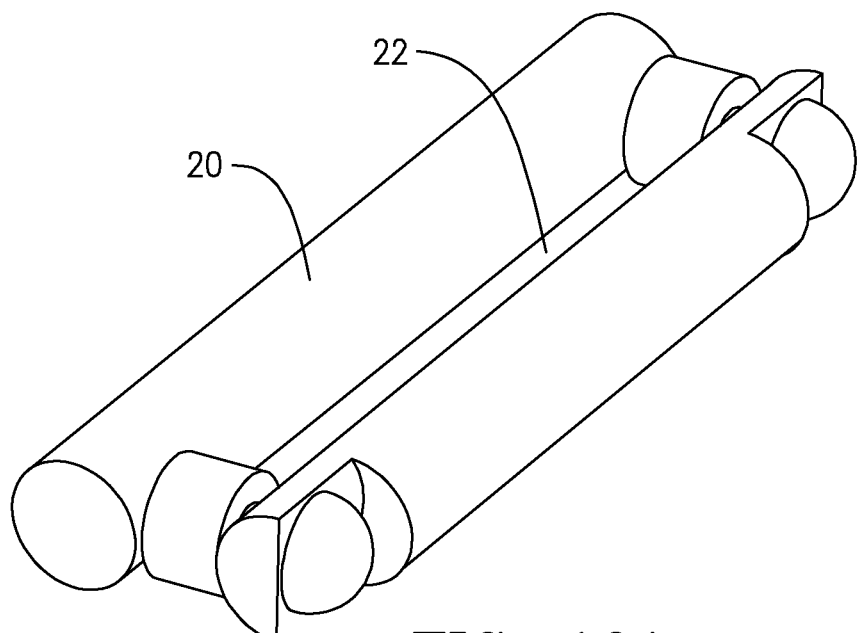
FIG. 10A is a perspective view of a screen of FIG. 10 in accordance with one or more embodiments of the present invention.

Now referring to FIG. 10, another embodiment of a drum 10 with concentric rings is shown. Each of the rings 302, 304, 306, 308 includes a plurality of adjacent screens 20, as shown in FIG. 10A. Parts 200 having been subjected to inspection are shown in various annular spaces between the rings or in space 301. Parts 200 remaining in the annular space 301 inside ring 302 failed to pass through a gauge 20 sized to prevent passage of parts above a maximum size. The screens 20 of rings 304, 306, 308 include gauges having gradually smaller openings, resulting in parts being retained in annular spaces between rings as shown.

Figure 11:
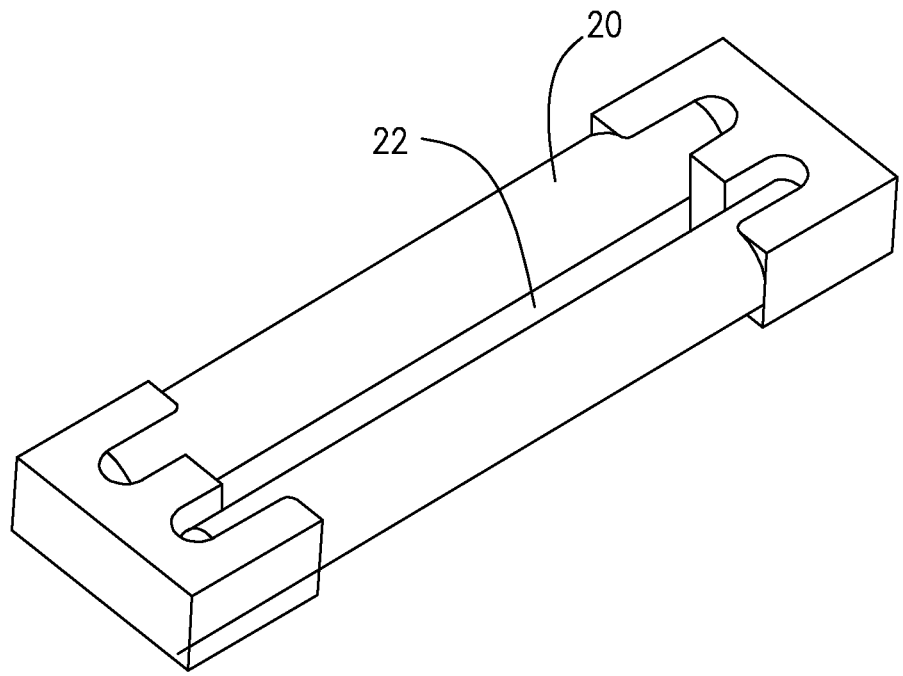
FIG. 11 is a perspective view of a screen in accordance with one or more embodiments of the present invention.

FIG. 11 shows another example of a screen 20 that may be employed in connection with devices of the present disclosure.

Figure 12:
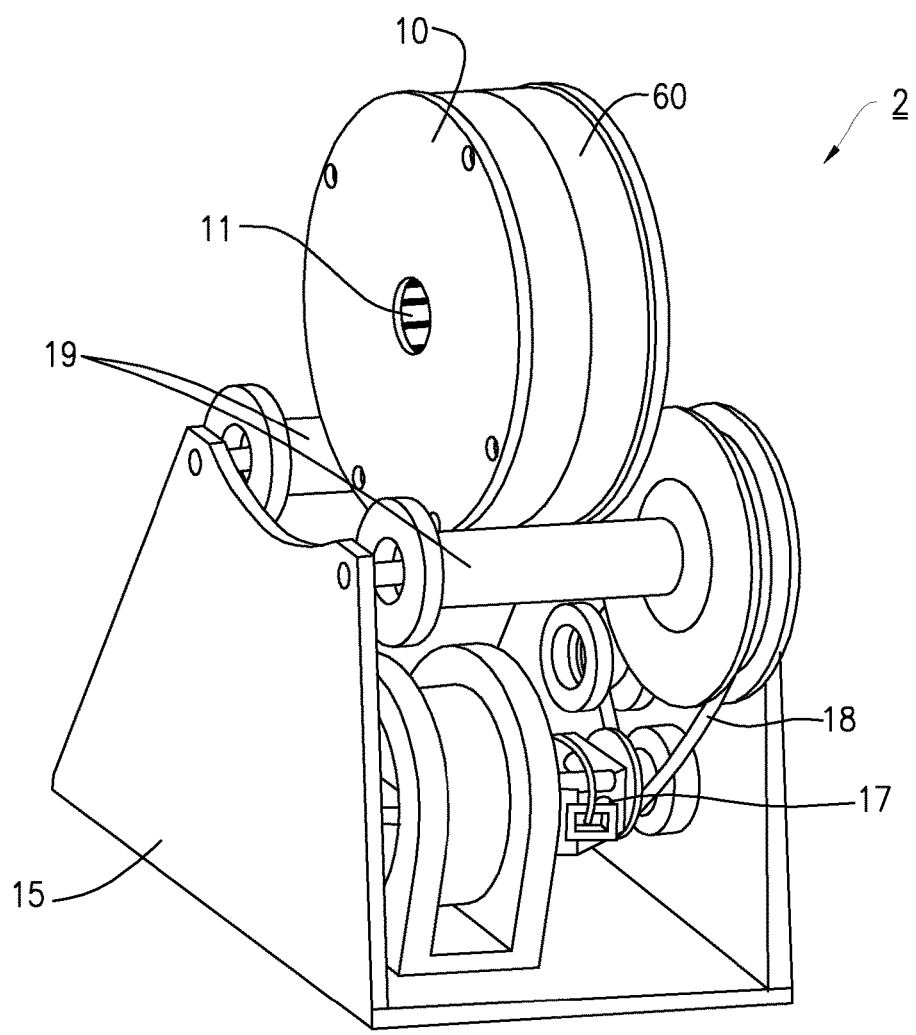
FIG. 12 is a perspective view of an inspection device with a drive apparatus in accordance with one or more embodiments of the present invention.

Now referring to FIG. 12, in another embodiment, the drum 10 may include a central fill opening 11. Parts may be filled through opening 11, subjected to inspection, and the parts that do not pass through the first (or only) concentric gauge may be emptied without removing cover 60.

Without being confined to a single theory, though it is noted that the fewer the number of gauges, the easier it is to control their accuracy, when inspecting for high statistical manufacturing capability, the accuracy and wear of the slots is less important, than when inspecting for absolute limits. This is because manufacturing capability is judged by how well the majority of parts are statistically located at the center of the tolerance band. This means that the maximum width gauges can be narrower than absolute, with allowance for wear and the minimum width gauges wider than absolute and still be useful. When operating in this mode, the initial discards are further examined in another tumbler (with gauges set at the absolute limits) to glean the smaller number of acceptable parts from the previous discards. The quantity of these "close to limit" parts give an indication of the capability of the manufacturing process. It is then a simple process to obtain relative percentages by simply weighing the group of parts close to the center of the tolerance band and comparing them to the weight of the group of parts close to the limits. This information, when combined with the actual sizes of the narrower maximum gauges and the wider minimum gauges can provide a report which describes manufacturing capability.

At least one advantage of the inspection devices disclosed herein is that the devices can be employed in a method to simply examine manufacturing capability and productive capability and thus eliminate the expensive process of sampling, measuring and calculation required by Production Part Approval Process (PPAP) procedures.

The apparatus disclosed herein can be employed to execute methods of inspection and sampling to ensure a given parts meet manufacturing and production standards. An initial examination of parts may be conducted using screens having gauges sized to select parts within a preselected tolerance range. Subsequent examination may be conducted using gauges set at a second preselected tolerance range.

For example, in accordance with one method, using the device shown for example in FIG. 4, i.e., a tumbler with concentric chambers, an initial examination may be made with the gauges set to select the central 40% of the tolerance range. Then those rejected are further examined in one or more simpler, single-chamber tumblers as disclosed herein, with the gauges set at 100% of the tolerance range. If the acceptable parts, below and above the central 40% tolerance range, amount to less than 16% of the total quantity of acceptable parts, and are evenly distributed, that is 8% above and 8% below, then it is likely that the Ppk is above 1.33.

For example, if a kilogram of part PV-00738-D is loaded and the diameter is examined, the initial tumbler gauges are set to a maximum of 0.0784" and a minimum of 0.0776" (40% of the total 0.002" tolerance range). If the parts which are rejected, because of being above the central range, are further examined in a single chamber tumbler, with gauges set to a maximum of 0.079", and the resulting acceptable parts weigh less than 80 grams, and similarly the parts which are below the central range are further examined in a tumbler with gauges set at 0.077" and the acceptable parts weigh less than 80 grams, then it is likely that the Ppk is above 1.33.

Converting this into quantities, there are about 2216 of these parts in a kilogram, so if fewer than 177 parts are above the central 40 percent, being between 0.0784" and 0.079", and fewer than 177 parts are below the central 40 percent, being between 0.0776" and 0.077", then it is likely that the Ppk is above 1.33.

This method not only may be employed to inspect large quantities, in very little time, but also to semi-automatically check on the production capability, in a fraction of the time, usually taken to sample, measure and calculate the Ppk. The aforementioned method may perform the inspection and check on production capability automatically or semi-automatically. Also, as the method is not merely sampling but is examining 100% of the products, it is more accurate.

It will be apparent to the skilled artisan that the methods may be employed using any of the devices disclosed herein. For example, the devices of FIGS. 6, 7, 8, 9 and 10 can be employed using different preselected-sized gauges to execute the method.

In another embodiment a vibrating tray having one or more screens with gauges is provided, whereby vibration of the tray causes agitation sufficient to present the parts to be inspected to the gauges and permit or deny exit of the parts being inspected. Parts under inspection which are smaller than the gauge size fall through.

It will be further apparent to those skilled in the art that the foregoing illustrations are merely exemplary, and the nature and design of the agitation and gauge is dependent on the part being inspected, and gauge size, number of gauges, number of screens, drum size, rotation speed and other variables may be varied without departing from the spirit and scope of the present disclosure.

Although the devices, systems and methods of the present disclosure have been described with reference to exemplary embodiments thereof, the present disclosure is not limited thereby. Indeed, the exemplary embodiments are implementations of the disclosed systems and methods are provided for illustrative and non-limitative purposes. Changes, modifications, enhancements and/or refinements to the disclosed systems and methods may be made without departing from the spirit or scope of the present disclosure. Accordingly, such changes, modifications, enhancements and/or refinements are encompassed within the scope of the present invention.

What is claimed is:

1. An inspection apparatus comprising a drum comprising a chamber for receiving parts to be inspected and at least one screen having at least one gauge formed therein, wherein the drum is configured to be rotatably mountable on a support, and wherein rotation of the drum is operable to present parts to be inspected to the at least one gauge.

2. The apparatus of claim 1 wherein the drum comprises an opening for receiving parts into the chamber.

3. The apparatus of claim 1 wherein the drum comprises an opening formed in a side thereof and the at least one screen comprises a cover for the opening formed in the side of the drum.

4. The apparatus of claim 3 wherein the at least one screen is removably mountable to the drum over the opening formed in a side thereof.

5. The apparatus of claim 2 wherein the screen is removably mountable to the drum over the opening for receiving parts.

6. The inspection apparatus of claim 1 wherein the drum is substantially cylindrical and comprises an outer surface circumscribing the chamber, and the at least one screen is formed in the outer surface.

7. The inspection apparatus of claim 6 wherein the screen comprises a plurality of gauges.

8. The inspection apparatus of claim 6 comprising at least two adjacent screens formed in the outer surface.

9. The inspection apparatus of claim 8 further comprising a cover configured and dimensioned to cover at least one of the two screens formed in the outer surface of the drum.

10. The inspection apparatus of claim 1 comprising at least two concentric drums spaced a preselected distance apart, wherein an inner of the at least two concentric drums comprises a screen comprising a plurality of gauges formed therein dimensioned to test a maximum width of a part under inspection, and an outer of the at least two concentric drums comprises a screen comprising a plurality of gauges formed therein dimensioned to test a minimum width of a part under inspection wherein the screens are arranged radially on a drum support surface.

11. The inspection apparatus of claim 10 wherein the concentric drums are open on one side.

12. The inspection apparatus of claim 11 further comprising a cover dimensioned to fit over and cover the concentric drums on the open side.

13. The inspection apparatus of claim 10 wherein the concentric drums comprise a plurality of adjacent screens, each screen comprising at least one gauge.

14. The inspection apparatus of claim 10 comprising more than two concentric drums wherein an innermost of the more than two concentric drums comprises a screen comprising a plurality of gauges formed therein dimensioned to test a maximum width of a part under inspection, and an outermost of the more than two concentric drums comprises a screen comprising a plurality of gauges formed therein dimensioned to test a minimum width of a part under inspection, and at least one concentric drum positioned between the innermost and outermost drums comprises a plurality of gauges formed therein dimensioned to test a width less than the maximum but more than the minimum width of a part under inspection.

15. The apparatus of claim 10 comprising a plurality of concentric drums wherein gauges of screens of concentrically arranged drums are sized in descending order from the innermost drum to the outermost drum.

16. The apparatus of claim 13 comprising a ring module comprising a plurality of gauges formed on an outer surface thereof, and a plurality of grooves, each of the grooves dimensioned to receive a screen comprising gauges, and a plurality of screens positioned in the grooves such that gauges of the plurality of screens are in register with the gauges of the ring module.

17. The apparatus of claim 10 wherein the drum support surface comprises a fill opening formed therein in axial alignment with an annular space formed by an interior diameter of the inner drum.

18. The apparatus of claim 1 further comprising a support upon which the drum is rotatably mountable.

19. The apparatus of claim 18 further comprising a drive apparatus operable to rotate the drum.

20. A method of inspecting a diameter of a part comprising providing a device according to claim 1, providing at least two screens having gauges sized to select parts within a preselected tolerance range, loading a plurality of parts to be inspected into the drum, rotating the drum, removing any part that does not pass through at least one of the screens, and conducting a subsequent examination using a gauge set at a second preselected tolerance range.

* * * * *